United States Patent
Lewis, II

(10) Patent No.: US 8,186,658 B2
(45) Date of Patent: May 29, 2012

(54) SCISSORLESS SUSPENSION SYSTEM FOR A SEAT ASSEMBLY AND MACHINE USING SAME

(75) Inventor: Charles E. Lewis, II, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 597 days.

(21) Appl. No.: 12/011,664

(22) Filed: Jan. 29, 2008

(65) Prior Publication Data

US 2009/0189407 A1 Jul. 30, 2009

(51) Int. Cl.
F16F 1/00 (2006.01)
F16F 5/00 (2006.01)
F16M 13/00 (2006.01)
F16M 1/00 (2006.01)

(52) U.S. Cl. .............. 267/131; 267/64.26; 248/562; 248/638; 297/339; 297/344.12; 297/344.18

(58) Field of Classification Search .......... 267/64.15, 267/64.16, 64.19, 64.21, 113, 117, 131, 132, 267/133, 64.26; 248/421, 559, 562, 580, 248/610, 616, 636; 297/337, 338, 339, 344.18
See application file for complete search history.

(56) References Cited

U.S. PATENT DOCUMENTS

| | | | | |
|---|---|---|---|---|
| 1,711,085 A * | 4/1929 | D Arcy | ............... | 248/560 |
| 4,150,805 A * | 4/1979 | Mazelsky | ............... | 244/122 R |
| 5,125,631 A | 6/1992 | Brodersen et al. | | |
| 5,222,709 A * | 6/1993 | Culley et al. | ............... | 248/421 |
| 5,273,260 A * | 12/1993 | Nagata | ............... | 267/131 |
| 5,538,117 A * | 7/1996 | Bouchez | ............... | 188/371 |
| 5,735,509 A | 4/1998 | Gryp et al. | | |
| 6,202,972 B1 * | 3/2001 | Manavi | ............... | 248/421 |
| 6,213,552 B1 * | 4/2001 | Miotto | ............... | 297/300.5 |
| 6,648,295 B2 * | 11/2003 | Herren et al. | ............... | 248/636 |
| 6,945,548 B2 * | 9/2005 | Dudding et al. | ............... | 280/124.157 |
| 7,044,553 B2 | 5/2006 | Ropp | | |
| 7,044,559 B2 | 5/2006 | Ropp et al. | | |
| 7,413,158 B1 * | 8/2008 | Burer | ............... | 248/564 |
| 7,735,917 B2 * | 6/2010 | Jones et al. | ............... | 297/216.1 |
| 2007/0295882 A1 * | 12/2007 | Catton | ............... | 248/588 |
| 2010/0117275 A1 * | 5/2010 | Nakamura | ............... | 267/133 |

* cited by examiner

*Primary Examiner* — Bradley King
*Assistant Examiner* — Vishal Sahni
(74) *Attorney, Agent, or Firm* — Liell & McNeil

(57) ABSTRACT

A suspension system for a seat assembly of a machine includes an upper support member and a lower support member. A plurality of vertically aligned guide pins interconnect the upper and lower support members, and are telescopically movable to adjust a distance between the upper and lower support members. A plurality of suspension devices are operatively connected to the upper and lower support members for biasing the upper support member away from the lower support member.

12 Claims, 3 Drawing Sheets

SCISSORLESS SUSPENSION SYSTEM FOR A SEAT ASSEMBLY AND MACHINE USING SAME

TECHNICAL FIELD

The present disclosure relates generally to a scissorless suspension system for a seat assembly, and more particularly to a suspension system having a plurality of telescoping guide pins for maintaining vertical alignment of the seat assembly.

BACKGROUND

In many off-highway operations, a machine operator must remain seated for extended periods of time while controlling operation of the machine. Seats may be designed to permit the operator to perform tasks from a comfortable position and isolate the operator, as much as possible, from vibrations of the machine. These vibrations may interfere with operator control and may cause the operator to fatigue more quickly.

A variety of seat suspensions have been designed to absorb and/or dissipate the forces imparted to the seat, including passive, semi-active, and active suspension systems. Passive suspension systems typically include a mechanical or air suspension coupled with a damper to dissipate the vibratory energy, and are popular because of their simplicity and cost compared to semi-active and active suspension systems. For example, U.S. Pat. No. 5,735,509 teaches a common scissors linkage system coupled with an air spring for vibration absorption and height adjustment.

The scissors type systems, however, including both the linkage and roller type scissors, have notable disadvantages. For example, the several pivot joints in the scissors linkage systems are all subject to wear and fatigue, and often result in the loosening of the mechanism. Roller type scissors systems are also subject to wear and failure, especially in response to lateral forces imparted to the scissors structure. Additionally, the scissoring action itself poses a risk to cut or twist hydraulic or pneumatic lines when the scissors mechanism is retracted quickly from an extended position. Therefore, there is a continuing need for suspensions that are simply constructed and inexpensive, while still providing the necessary absorption of vibrations over an expected machine life span.

The present disclosure is directed to one or more of the problems set forth above.

SUMMARY OF THE DISCLOSURE

In one aspect, a suspension system for a seat assembly of a machine includes an upper support member and a lower support member. A plurality of vertically aligned guide pins interconnect the upper and lower support members, and are telescopically movable to adjust a distance between the upper and lower support members. A plurality of suspension devices are operatively connected to the upper and lower support members for biasing the upper support member away from the lower support member.

In another aspect, a method of supporting a seat assembly of a machine includes a step of maintaining vertical alignment of an upper support member and a lower support member using a first device. The upper support member is biased away from the lower support member using a second device. The method also includes a step of damping a vibration of the upper support member in response to a movement permitted by the first device using a third device.

In yet another aspect, a suspension system for a seat assembly of a machine includes a lower support member attached to a machine body, and an upper support member having a seat assembly mounted thereon. Four telescoping guide pins interconnect the upper and lower support members. The guide pins are vertically aligned and telescopically movable to adjust a distance between the upper and lower support members. Two air springs are operatively connected to the upper and lower support members for biasing the upper support member away from the lower support member. Two cross-mounted dampers are coupled to the upper and lower support members for damping a vibration of the upper support member in response to a movement permitted by the guide pins.

DETAILED DESCRIPTION

Figure 1:
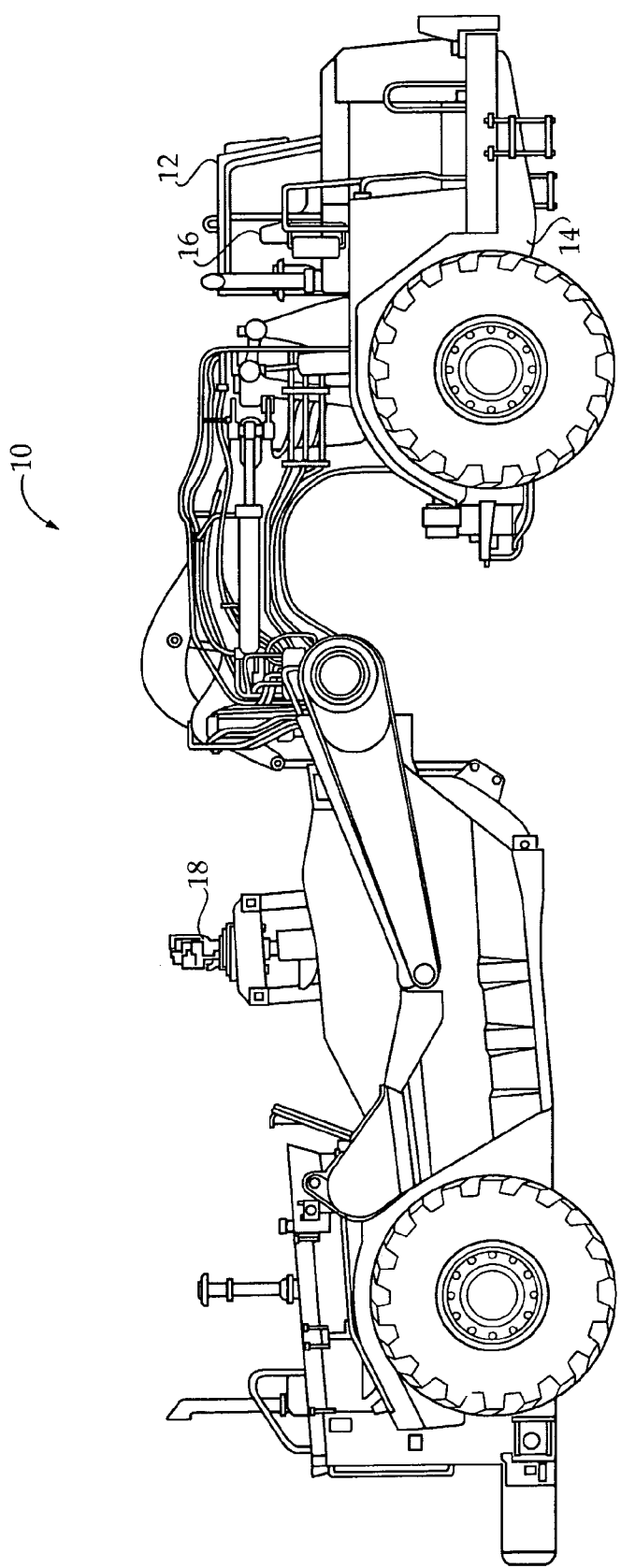
FIG. 1 is a side diagrammatic view of a machine according to the present disclosure.

An exemplary embodiment of a machine 10 is shown generally in FIG. 1. The machine 10 may be a wheel tractor scraper, as shown, or any other machine or vehicle, having an operator control station 12. Other machines may include, but are not limited to, wheeled log skidders, track-type tractors, wheel loaders, articulated trucks, and other types of construction, mining, and agricultural machines. The operator control station 12 is mounted to a body 14 of the machine 10 and may include a seat assembly 16. The operator control station 12 may include various other devices, including, but not limited to, one or more machine operation controllers. For example, a machine operation controller may be provided for controlling movement of an implement 18, such as an auger, of the machine 10.

Figure 2:
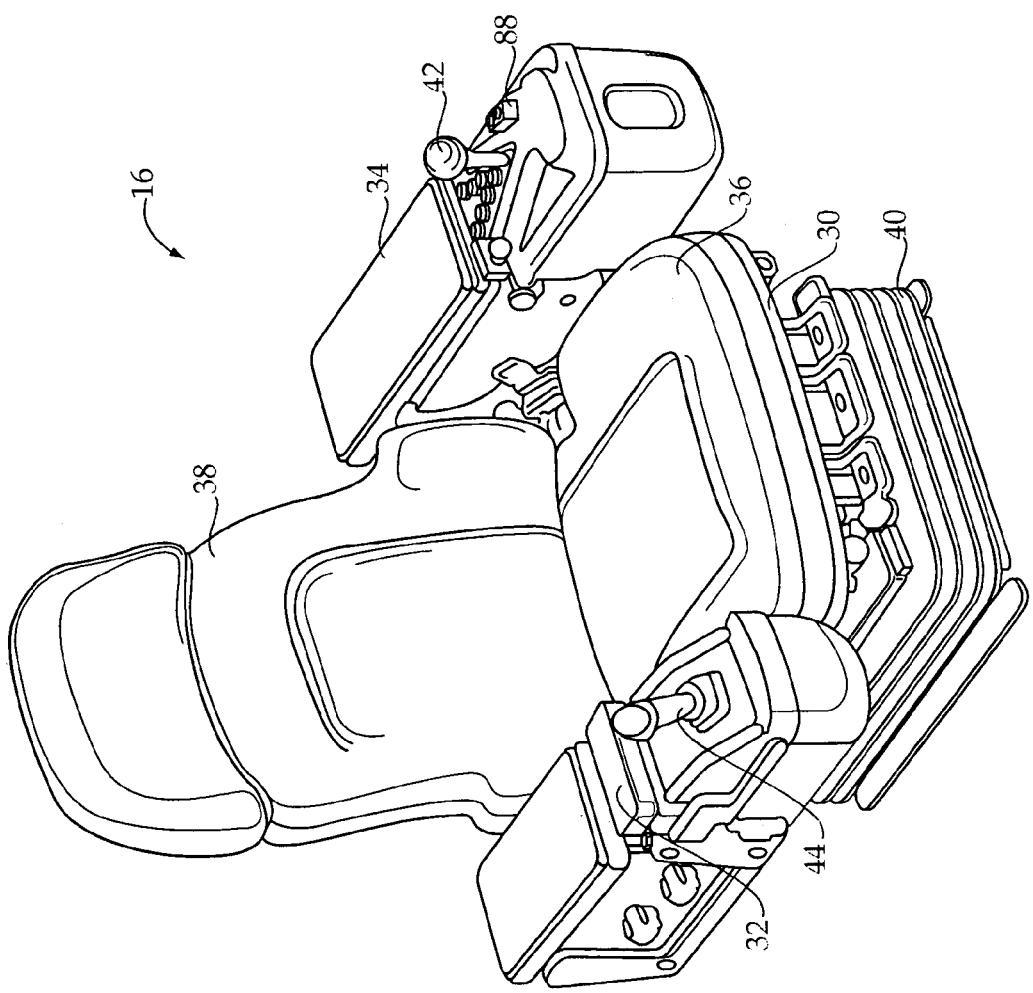
FIG. 2 is a perspective view of a seat assembly of the machine of FIG. 1.

The seat assembly 16 is shown generally in FIG. 2, and includes a seat frame 30 to which a first armrest 32, a second armrest 34, a seat 36, and a back 38 are attached. The seat frame 30 may include or may be mounted on a suspension system 40 or, more specifically, a seat suspension system for supporting the seat assembly 16 and damping vibrations associated with operation of the machine 10. The seat assembly 16 may also include one or more machine operation controllers, such as controllers 42 and 44 pivotably attached to the first armrest 32 and second armrest 34, respectively. Machine operation controllers 42 and 44 may be used to control various operations of the machine 10. For example, machine operation controller 42 may include a directional controller, while machine operation controller 44 may be used to control movement of the implement 18 of the machine 10.

Figure 3:
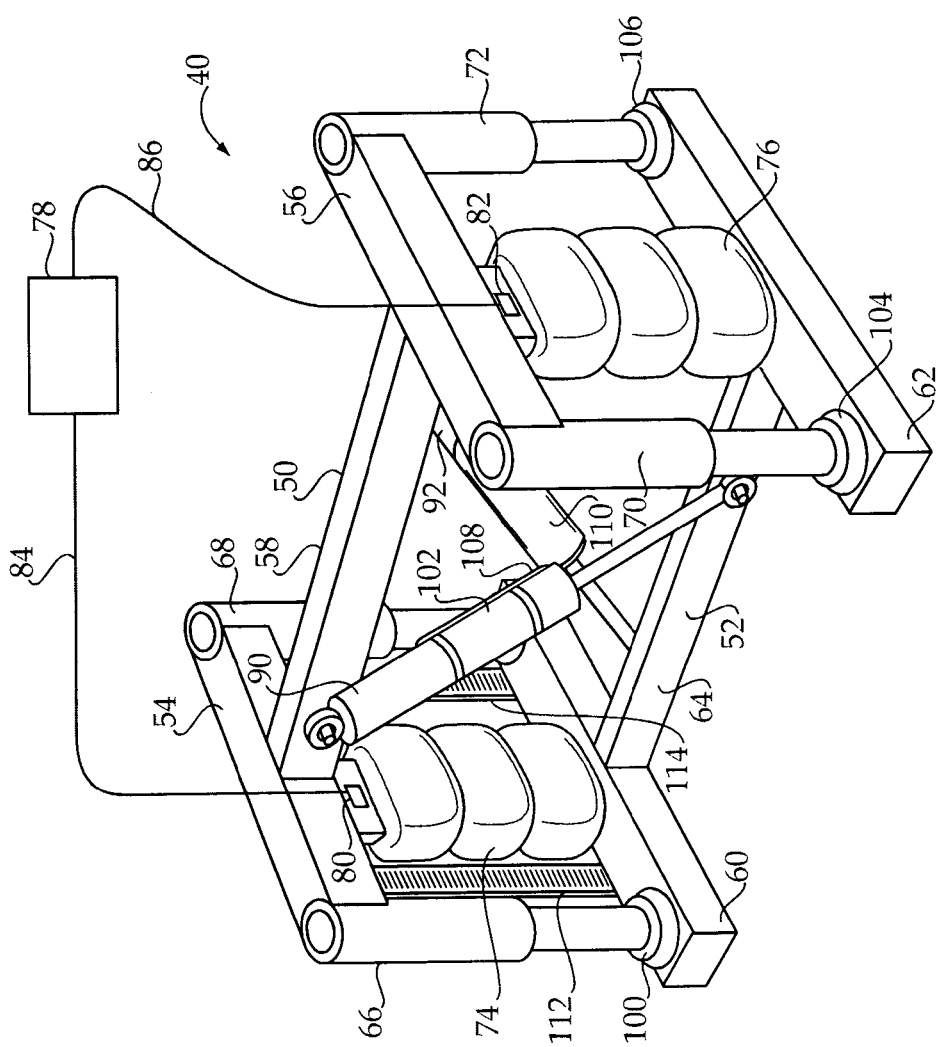
FIG. 3 is a perspective view of a suspension system of the seat assembly of FIG. 2.

Turning now to FIG. 3, the suspension system 40 is shown in greater detail. The suspension system 40 includes an upper support member 50 and a lower support member 52. Referring again to FIGS. 1 and 2, it should be appreciated that the lower support member 52 may be attached to the machine body 14 using any known attachment means, while the upper support member 50 may include the seat 36 or, alternatively, the seat frame 30 mounted thereon. Each of the upper and lower support members 50 and 52 may have a generally I-shaped structure. For example, the upper support member 50 may include two parallel ends 54 and 56 connected by a connecting structure 58 that is perpendicular to the parallel ends 54 and 56. Similarly, the lower support member 52 may comprise two parallel ends 60 and 62 connected by a connecting structure 64. Although I-shaped structures are depicted for upper and lower support members 50 and 52, it should be appreciated that structures having various other shapes or cross sections may be substituted for the support members 50 and 52.

The upper and lower support members 50 and 52 may be interconnected by a plurality of telescoping guide pins, such as telescoping guide pins 66, 68, 70, and 72. The telescoping guide pins 66, 68, 70, and 72 may be vertically aligned, as shown, and telescopically movable to adjust a distance between the upper and lower support members 50 and 52. According to one embodiment, the telescoping guide pins 66, 68, 70, and 72 may interconnect the upper and lower support members 50 and 52 at perimeters thereof. Specifically, telescoping guide pins 66 and 68 may interconnect the upper and lower support members 50 and 52 at opposing sides of each of the parallel ends 54 and 60. Similarly, telescoping guide pins 70 and 72 may interconnect the upper and lower support members 50 and 52 at opposing sides of the parallel ends 56 and 62.

Telescoping guide pins 66, 68, 70, and 72 are well known and may include any type or configuration of telescoping posts, such as those including tubes and rods, for maintaining vertical alignment of the upper and lower support members 50 and 52. Specifically, the telescoping guide pins 66, 68, 70, and 72 allow vertical movement of the upper support member 50 with respect to the lower support member 52. It should be appreciated that the number, size, and arrangement of the telescoping guide pins 66, 68, 70, and 72 may be selected to isolate the operator from vertical vibrations, as much as possible.

One or more suspension devices, such as suspension devices 74 and 76, may be operatively connected to the upper and lower support members 50 and 52, such as at opposing ends thereof, for biasing the upper support member 50 away from the lower support member 52. According to one embodiment, the suspension devices 74 and 76 may each comprise a mechanical coil spring. Alternatively, however, the suspension devices 74 and 76 may include well known air springs, as shown. According to a further embodiment, any combination of mechanical springs, air springs, or various other means for providing a spring force between the upper and lower support members 50 and 52 is contemplated. It should also be appreciated that, although two suspension devices 74 and 76 are shown, more than two suspension devices may be preferred.

It should be appreciated that an embodiment incorporating air springs may also include a pneumatic source 78, such as, for example, an air compressor, in communication with valves 80 and 82 of the suspension devices 74 and 76, respectively, via pneumatic lines 84 and 86 for controlling a pressure within the air springs. For example, it may be desirable to increase or decrease a pressure within the air springs as necessary to support a seat, such as seat assembly 16, and operator load. Specifically, an automatic leveling feature, such as a leveling valve, may be provided that adjusts the pressure within the air springs in response to different loads. It may also be desirable to provide a height adjustment actuator 88, as shown in FIG. 2, that may be in communication with the pneumatic source 78 and valves 80 and 82 for adjusting a height of the seat assembly 16 based on a user preference. Specifically, the height adjustment actuator 88 may be movable to increase or decrease the volume of air within the air springs to raise or lower the air springs, thereby adjusting the seat assembly 16 to the desired height.

One or more dampers, such as dampers 90 or 92, may be provided for damping a vibration of the upper support member 54 in response to movement permitted by the telescoping guide pins 66, 68, 70, and 72. It may be desirable to utilize additional dampers, depending on the desired resistance. It may also be desirable to mount the dampers 90 and 92 along axes having an angle greater than zero with respect to the telescoping guide pins 66, 68, 70, and 72. The two cross-mounted dampers 90 and 92 may, therefore, collapse at a lower height, and may include any of a variety of well known dampers, such as, for example, hydraulic cylinders and pneumatic cylinders. It should be appreciated that one of air and fluid is typically displaced through a valve or an orifice of each of the dampers 90 and 92 to provide a damping effect. Further, it should be appreciated that the number, size, and configuration of the dampers 90 and 92 may be varied to provide a desired resistance. For example, it may be desirable to utilize electronically controlled hydraulic fluid flow within the dampers 90 and 92 in order to continuously change the damping characteristics of the dampers 90 and 92.

It should be appreciated that additional components or features may be used with suspension system 40. For example, bumpers 100, 102, 104, and 106 may be used with telescoping guide pins 66, 68, 70, and 72, respectively, to prevent direct contact and, as a result, wear between the lower support member 52 and the moving components of guide pins 66, 68, 70, and 72. In addition, plates or guides, such as plates 108 and 110, may provide surfaces along which the cross-mounted dampers 90 and 92 may engage one another. Further, tether straps 112 and 114 may be fixedly attached to the suspension system 40 and may provide a means for fixing a position of the suspension system 40 with respect to the machine 10. Although specific examples are depicted, it should be appreciated that numerous enhancements to the suspension system 40 are contemplated.

Industrial Applicability

Referring to FIGS. 1-3, an exemplary embodiment of a machine 10 may include a wheel tractor scraper, as shown, or any other machine or vehicle, having an operator control station 12. The operator control station 12 is mounted to a body 14 of the machine 10 and may include a seat assembly 16. The operator control station 12 may include various other devices, including, but not limited to, one or more machine operation controllers. For example, machine operation controller 42 may include a directional controller, while machine operation controller 44 may be used to control movement of an implement 18 of the machine 10.

An operator of the machine 10 may have to remain seated, and typically coupled to the seat assembly 16 via a seatbelt, for extended periods of time while controlling operation of the machine 10. The seat assembly 16, therefore, should be designed to permit the operator to perform tasks from a comfortable position and isolate the operator, as much as possible, from vibrations of the machine 10. This is of particular importance for machines subject to high vibration levels. Wheel tractor scrapers, for example, often perform initial clearing and excavation and, therefore, operate over very rough terrain. These increased vibrations may interfere with operator control and may cause the operator to fatigue more quickly, and may disrupt machine operation.

During a typical operation, an operator may sit in the seat assembly 16 and adjust the height of the seat assembly 16 using the height adjustment actuator 88. Specifically, the height adjustment actuator 88 may be movable to increase or decrease the volume of air within suspension devices 74 and 76 or, more specifically, air springs to raise or lower the suspension devices 74 and 76, thereby adjusting the seat assembly 16 to a desired height. Once at a desired height, the operator may actuate a machine operation controller, such as a directional controller 42, to move the machine 10 in a desired direction. As the machine 10 moves, it may encounter a rut that causes the machine 10 to drop.

The suspension system 40 vertically isolates the seat assembly 16 and, therefore, the operator from this movement using the telescoping guide pins 66, 68, 70, and 72. Specifically, the telescoping guide pins 66, 68, 70, and 72 may elongate and allow vertical movement of the upper support member 50 with respect to the lower support member 52. Dampers 90 and 92 may be provided for damping the vibration of the upper support member 54 in response to the vertical movement permitted by the telescoping guide pins 66, 68, 70, and 72.

As the machine 10 passes out of the rut and moves upward, the telescoping guide pins 66, 68, 70, and 72 may shorten, again isolating the seat assembly 16 and operator from this vertical movement. Dampers 90 and 92 again provide damping of the vibration of the upper support member 54 in response to the movement permitted by the telescoping guide pins 66, 68, 70, and 72. The machine 10 then returns to an initialized position in which the suspension devices 74 and 76 bias the upper support member 50 of the seat assembly away from the lower support member 52.

The suspension system 40 of the present disclosure provides a simply constructed and relatively inexpensive alternative to scissors type suspensions, while still providing the necessary support and absorption of vibrations. Specifically, the suspension system 40 may include a first device 94 for maintaining vertical alignment of an upper support member 50 and a lower support member 52. For example, the first device 94 may include a plurality of telescoping guide pins 66, 68, 70, and 72 positioned at perimeters of the suspension system 40. The telescoping guide pins 66, 68, 70, and 72 may include any device for maintaining vertical alignment of the upper and lower support members 50 and 52. It should be appreciated that the number, size, and arrangement of the telescoping guide pins 66, 68, 70, and 72 may be selected to isolate the operator from lateral and fore and aft vibrations, as much as possible.

A second device 96 may bias the upper support member 50 away from the lower support member 52. The second device 96 may include one or more suspension devices 74 and 76 operatively connected to the upper and lower support members 50 and 52, such as at opposing ends thereof. The suspension devices 74 and 76 may include mechanical coil springs, air springs, or other devices capable of providing a spring force between the upper and lower support members 50 and 52.

If air springs are utilized, suspension system 40 may also include a pneumatic source 78 in communication with valves 80 and 82 of the suspension devices 74 and 76, respectively, via pneumatic lines 84 and 86 for controlling a pressure within the air springs. Air springs, as should be appreciated by those skilled in the art, typically include a leveling feature for automatically adjusting the pressure within the air springs in response to different loads. A height adjustment actuator 88, in communication with the pneumatic source 78 and valves 80 and 82, may also be provided for adjusting a height of the seat assembly 16 based on a user preference.

A third device 98 may also be provided for damping a vibration of the upper support member 50 in response to a movement permitted by the first device 94 or, more specifically, the telescoping guide pins 66, 68, 70, and 72. The third device 98 may include one or more dampers, such as dampers 90 or 92. It may be desirable to mount the dampers 90 and 92 along axes having an angle greater than zero with respect to the telescoping guide pins 66, 68, 70, and 72. This will allow the dampers 90 and 92 to collapse at a lower height than if they were mounted along vertical axes. It should be appreciated that the number, size, and configuration of dampers, such as dampers 90 and 92, may be varied to provide a desired resistance.

The suspension system 40 of the present disclosure provides a simple and inexpensive means for providing vibration isolation that is not subject to some of the failures of a typical scissors type suspension. Specifically, scissors suspensions include several pivot joints that may be subject to wear and fatigue, often resulting in a loosening of the mechanism. The current suspension system 40 includes fewer joints and, therefore, is capable of providing a more reliable and durable suspension system for a seat assembly of a machine.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A suspension system for a seat assembly of a machine, comprising:
    an upper support member;
    a lower support member;
    a plurality of guide pins interconnecting the upper and lower support members at perimeters thereof, wherein the guide pins are vertically aligned and telescopically movable to adjust a distance between the upper and lower support members, wherein the guide pins maintain a vertical alignment of the upper support member relative to the lower support member and have a non-pivotable attachment to each of the upper and lower support members;
    a plurality of suspension devices operatively connected to the upper and lower support members at opposing ends thereof for biasing the upper support member away from the lower support member, wherein each of the suspension devices is positioned between two of the guide pins; and
    two cross-mounted dampers coupled to the upper and lower support members at positions offset from a center of the upper support member for damping a vibration of the upper support member in response to a movement permitted by the guide pins, wherein a first damper is mounted along a first axis having a first angle greater than zero with respect to the guide pins and a second damper is mounted along a second axis having a second angle greater than zero with respect to the guide pins, wherein the first angle and the second angle are different.

2. The suspension system of claim 1, further including four guide pins positioned to interconnect the upper and lower support members.

3. The suspension system of claim 2, further including two suspension devices operatively connected to the upper and lower support members at opposing ends thereof.

4. The suspension system of claim 3, wherein the suspension devices include coil springs.

5. The suspension system of claim 3, wherein the suspension devices include air springs.

6. The suspension system of claim 5, further including a height adjustment actuator in communication with a pneumatic source and a valve of each of the air springs for controlling a pressure within each of the air springs.

7. The suspension system of claim 1, wherein the dampers are one of hydraulic cylinders and pneumatic cylinders.

8. A machine, comprising:
a machine body;
a lower support member attached to the machine body;
an upper support member having a seat assembly mounted thereon;
four telescoping guide pins interconnecting the upper and lower support members at perimeters thereof, wherein the guide pins are vertically aligned and telescopically movable to adjust a distance between the upper and lower support members, wherein the guide pins maintain a vertical alignment of the upper support member relative to the lower support member and have a non-pivotable attachment to each of the upper and lower support members;
two air springs operatively connected to the upper and lower support members at opposing ends thereof for biasing the upper support member away from the lower support member, wherein each of the air springs is positioned between two of the telescoping guide pins; and
two cross-mounted dampers coupled to the upper and lower support members at positions offset from a center of the upper support member for damping a vibration of the upper support member in response to a movement permitted by the guide pins, wherein a first damper is mounted along a first axis having a first angle greater than zero with respect to the telescoping guide pins and a second damper is mounted along a second axis having a second angle greater than zero with respect to the telescoping guide pins, wherein the first angle and the second angle are different.

9. The machine of claim 8, further including a height adjustment actuator in communication with a pneumatic source and a valve of each of the air springs for controlling a pressure within each of the air springs.

10. The machine of claim 8, wherein the two cross-mounted dampers are hydraulic cylinders.

11. The machine of claim 8, further including a machine operation controller pivotably attached to the seat assembly.

12. The machine of claim 11, wherein the machine operation controller is at least one of a directional controller and an implement controller.

* * * * *

UNITED STATES PATENT AND TRADEMARK OFFICE
CERTIFICATE OF CORRECTION

PATENT NO. : 8,186,658 B2
APPLICATION NO. : 12/011664
DATED : May 29, 2012
INVENTOR(S) : Lewis et al.

Page 1 of 1

It is certified that error appears in the above-identified patent and that said Letters Patent is hereby corrected as shown below:

In the Specification

Column 4, line 33, delete "Industrial Applicability" and insert -- INDUSTRIAL APPLICABILITY --.

Signed and Sealed this
First Day of September, 2015

Michelle K. Lee
*Director of the United States Patent and Trademark Office*